United States Patent
Kobayashi et al.

(10) Patent No.: US 9,509,931 B2
(45) Date of Patent: Nov. 29, 2016

(54) SOLID-STATE IMAGING APPARATUS AND CAMERA

(71) Applicant: CANON KABUSHIKI KAISHA, Tokyo (JP)

(72) Inventors: Hideo Kobayashi, Tokyo (JP); Hiroki Hiyama, Sagamihara (JP); Kazuo Yamazaki, Yokohama (JP); Hiroaki Kameyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/663,592

(22) Filed: Mar. 20, 2015

(65) Prior Publication Data

US 2015/0281615 A1 Oct. 1, 2015

(30) Foreign Application Priority Data

Apr. 1, 2014 (JP) .................................. 2014-075727

(51) Int. Cl.
| | |
|---|---|
| H04N 5/378 | (2011.01) |
| H04N 5/232 | (2006.01) |
| H04N 5/376 | (2011.01) |
| H04N 5/225 | (2006.01) |
| H04N 5/3745 | (2011.01) |

(52) U.S. Cl.
CPC ............ *H04N 5/378* (2013.01); *H04N 5/2253* (2013.01); *H04N 5/23241* (2013.01); *H04N 5/3765* (2013.01); *H04N 5/37455* (2013.01)

(58) Field of Classification Search
CPC ........... H04N 5/2253; H04N 5/23241; H04N 5/37455; H04N 5/3765; H04N 5/378
See application file for complete search history.

(56) References Cited

U.S. PATENT DOCUMENTS

| | | | |
|---|---|---|---|
| 6,188,094 B1 | 2/2001 | Kochi et al. | |
| 6,605,850 B1 | 8/2003 | Kochi et al. | |
| 6,665,013 B1 * | 12/2003 | Fossum ................ | G11C 19/282 257/E27.134 |
| 6,670,990 B1 | 12/2003 | Kochi et al. | |
| 6,946,637 B2 | 9/2005 | Kochi et al. | |
| 6,960,751 B2 | 11/2005 | Hiyama et al. | |
| 7,110,030 B1 | 9/2006 | Kochi et al. | |
| 7,187,052 B2 | 3/2007 | Okita et al. | |
| 7,283,305 B2 | 10/2007 | Okita et al. | |

(Continued)

FOREIGN PATENT DOCUMENTS

JP 2008-172609 A 7/2008

OTHER PUBLICATIONS

U.S. Appl. No. 14/564,506, filed Dec. 9, 2014, Hiroki Hiyama, et al.
(Continued)

*Primary Examiner* — Amy Hsu
(74) *Attorney, Agent, or Firm* — Fitzpatrick, Cella, Harper & Scinto

(57) ABSTRACT

A solid-state imaging apparatus, comprising a pixel array in which a plurality of pixels are arrayed, a plurality of processing units, forming a plurality of groups each including two or more processing units, an output line, a power supply line, a plurality of signal lines corresponding to the plurality of groups and connecting output nodes of the two or more processing units in the corresponding group, a plurality of connecting units provided between the output line and the plurality of signal lines, and a control unit configured to control the plurality of processing units and the plurality of connecting units based on a group including the two or more processing units being to output signals.

12 Claims, 11 Drawing Sheets

(56) References Cited

U.S. PATENT DOCUMENTS

| | | |
|---|---|---|
| 7,423,790 B2 | 9/2008 | Kochi et al. |
| 7,429,764 B2 | 9/2008 | Koizumi et al. |
| 7,531,885 B2 | 5/2009 | Okita et al. |
| 7,538,804 B2 | 5/2009 | Okita et al. |
| 7,547,871 B2 | 6/2009 | Hiyama et al. |
| 7,557,847 B2 | 7/2009 | Okita et al. |
| 7,638,826 B2 | 12/2009 | Hiyama et al. |
| 7,646,493 B2 | 1/2010 | Okita et al. |
| 7,755,688 B2 | 7/2010 | Hatano et al. |
| 7,812,873 B2 | 10/2010 | Hiyama et al. |
| 7,812,876 B2 | 10/2010 | Hiyama et al. |
| 7,816,755 B2 | 10/2010 | Yamazaki et al. |
| 7,889,254 B2 | 2/2011 | Kochi et al. |
| 7,961,237 B2 | 6/2011 | Hatano et al. |
| 7,990,440 B2 | 8/2011 | Kobayashi et al. |
| 8,045,034 B2 | 10/2011 | Shibata et al. |
| 8,049,799 B2 | 11/2011 | Sonoda et al. |
| 8,106,955 B2 | 1/2012 | Okita et al. |
| 8,120,686 B2 | 2/2012 | Hatano et al. |
| 8,149,309 B2* | 4/2012 | Tanaka .................. H04N 5/335 348/300 |
| 8,174,604 B2 | 5/2012 | Shibata et al. |
| 8,208,055 B2 | 6/2012 | Hiyama |
| 8,218,050 B2 | 7/2012 | Ogura et al. |
| 8,325,260 B2 | 12/2012 | Yamazaki et al. |
| 8,416,329 B2 | 4/2013 | Hiyama et al. |
| 8,427,565 B2 | 4/2013 | Hiyama |
| 8,451,360 B2 | 5/2013 | Nakamura et al. |
| 8,493,487 B2 | 7/2013 | Takada et al. |
| 8,552,481 B2 | 10/2013 | Hiyama et al. |
| 8,553,101 B2 | 10/2013 | Okita et al. |
| 8,598,901 B2 | 12/2013 | Hiyama et al. |
| 8,643,765 B2 | 2/2014 | Takada et al. |
| 8,710,558 B2 | 4/2014 | Inoue et al. |
| 8,711,259 B2 | 4/2014 | Maehashi et al. |
| 8,760,337 B2 | 6/2014 | Yamazaki |
| 8,810,706 B2 | 8/2014 | Yamazaki et al. |
| 8,823,849 B2 | 9/2014 | Hiyama et al. |
| 8,835,828 B2 | 9/2014 | Kobayashi |
| 8,836,313 B2 | 9/2014 | Takagi et al. |
| 8,836,838 B2 | 9/2014 | Nakamura et al. |
| 8,884,391 B2 | 11/2014 | Fudaba et al. |
| 8,928,786 B2 | 1/2015 | Iwata et al. |
| 9,029,752 B2 | 5/2015 | Saito et al. |
| 2005/0151058 A1* | 7/2005 | Ang ...................... H04N 5/378 250/208.1 |
| 2005/0174552 A1 | 8/2005 | Takada et al. |
| 2007/0205439 A1 | 9/2007 | Okita et al. |
| 2009/0128676 A1* | 5/2009 | Tanaka .................. H04N 5/335 348/300 |
| 2009/0134911 A1* | 5/2009 | Kinugasa ............. H04N 3/1525 326/57 |
| 2009/0201406 A1 | 8/2009 | Okita et al. |
| 2012/0013778 A1 | 1/2012 | Sonoda et al. |
| 2012/0175503 A1 | 7/2012 | Kuroda et al. |
| 2012/0188428 A1* | 7/2012 | Tanaka .................. H04N 5/335 348/300 |
| 2013/0062503 A1 | 3/2013 | Saito et al. |
| 2013/0068930 A1 | 3/2013 | Nakamura et al. |
| 2013/0140440 A1 | 6/2013 | Kobayashi |
| 2013/0235241 A1 | 9/2013 | Nakamura et al. |
| 2013/0242151 A1 | 9/2013 | Yamazaki |
| 2014/0002684 A1 | 1/2014 | Okita et al. |
| 2014/0002690 A1 | 1/2014 | Hiyama et al. |
| 2014/0253767 A1 | 9/2014 | Kato et al. |
| 2014/0312207 A1* | 10/2014 | Ikeda .................. H04N 5/3598 250/208.1 |
| 2014/0312210 A1 | 10/2014 | Kobayashi |
| 2014/0320717 A1* | 10/2014 | Hiyama ................ H04N 5/378 348/308 |
| 2015/0042857 A1 | 2/2015 | Kususaki et al. |
| 2015/0062394 A1* | 3/2015 | Ikeda ..................... H04N 5/347 348/301 |
| 2015/0077607 A1 | 3/2015 | Yamazaki et al. |
| 2015/0103218 A1* | 4/2015 | Tanaka .................. H04N 5/335 348/300 |

OTHER PUBLICATIONS

U.S. Appl. No. 14/591,168, filed Jan. 7, 2015, Yu Maehashi, et al.
U.S. Appl. No. 14/591,180, filed Jan. 7, 2015, Hideo Kabayashi, et al.
U.S. Appl. No. 14/594,245, filed Jan. 12, 2015, Kazuhiro Saito, et al.
U.S. Appl. No. 14/614,980, filed Feb. 5, 2015, Tetsuya Itano, et al.
U.S. Appl. No. 14/618,143, filed Feb. 10, 2015, Kazuhiro Saito, et al.
U.S. Appl. No. 14/710,084, filed May 12, 2015, Kazuo Yamazaki, et al.

* cited by examiner

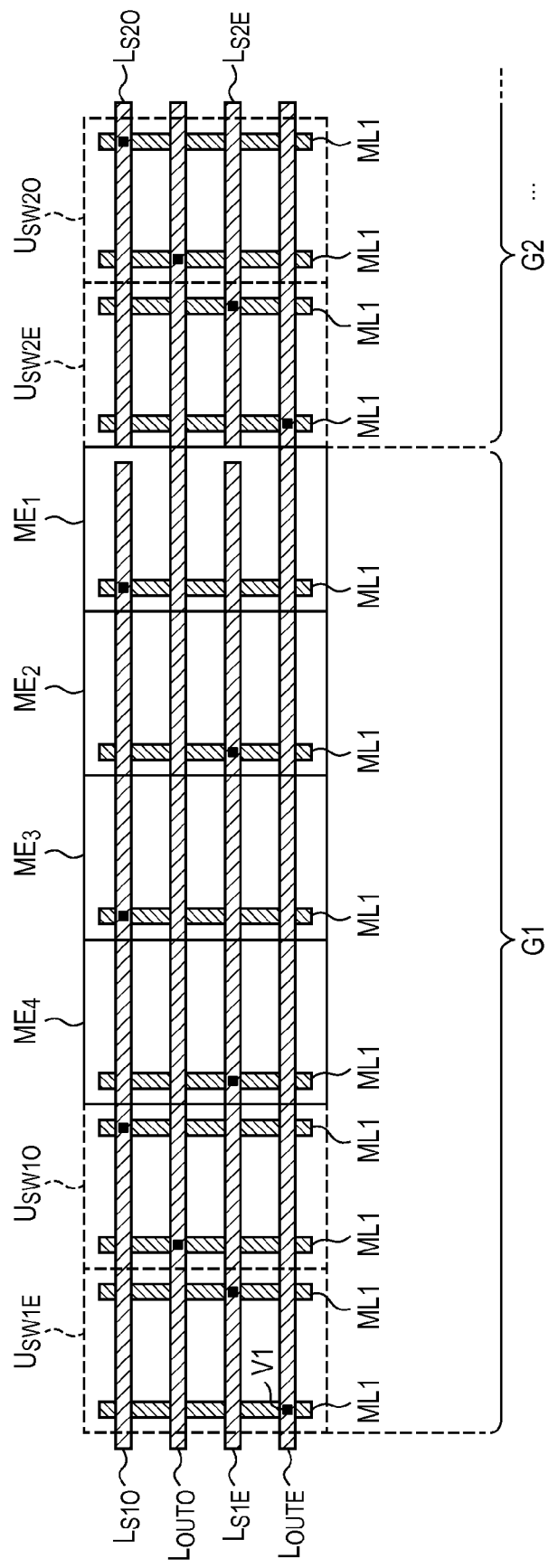

SOLID-STATE IMAGING APPARATUS AND CAMERA

BACKGROUND OF THE INVENTION

Field of the Invention

The present invention relates to a solid-state imaging apparatus and a camera.

Description of the Related Art

A solid-state imaging apparatus includes a pixel array in which a plurality of pixels are arrayed, a plurality of processing units which process signals from respective pixels on each column of the pixel array, and an output line configured to output a signal from each processing unit.

Some solid-state imaging apparatuses have an arrangement in which a plurality of processing units are divided into a plurality of groups such that each of them includes two or more processing units, and one switch which connects the two or more processing units and an output line is provided for each group. For example, in a case that a signal is output from each processing unit of a certain group, the signals from two or more processing units of that group are sequentially output while setting the switch in a conductive state in that group, whereas the switch is set in a non-conductive state in each of the other groups. This arrangement is advantageous in increasing the operation speed of the solid-state imaging apparatus because the load capacitance of the output line is reduced as compared with a case in which all of the plurality of processing units are directly connected to the output line.

If a node between the switch and the two or more processing units of the above-described other group is set in a floating state while the switch is set in the non-conductive state in the other group, a potential variation may occur in this node. This may cause a malfunction of the solid-state imaging apparatus, latch-up, the insulation breakdown of a MOS transistor, or the like and reduce the reliability of the solid-state imaging apparatus.

SUMMARY OF THE INVENTION

The present invention provides a technique advantageous in improving the reliability of a solid-state imaging apparatus.

One of the aspects of the present invention provides a solid-state imaging apparatus comprising a pixel array in which a plurality of pixels are arrayed and a plurality of processing units configured to process signals from the respective pixels on each column of the pixel array, the plurality of processing units forming a plurality of groups each including two or more processing units, the apparatus comprising an output line, a power supply line configured to transfer a power voltage, a plurality of signal lines each provided for each of the plurality of groups and configured to connect output nodes of the two or more processing units in the group to each other, a plurality of connecting units provided in a path between the output line and the plurality of signal lines, and a control unit, wherein, in a case that outputting signals from the processing units in one group out of the plurality of groups, the control unit controls the plurality of processing units and the plurality of connecting units, for the one group, so as to output the signals from the processing units in the one group while electrically connecting the signal line and the output line, and for the other groups out of the plurality of groups, so as to connect the signal line and the power supply line electrically while maintaining outputs from the respective processing units in the other groups in high impedance states.

Further features of the present invention will become apparent from the following description of exemplary embodiments with reference to the attached drawings.

BRIEF DESCRIPTION OF THE DRAWINGS

FIG. 11 is a view for explaining an example of the upper surface of the layout of each wiring pattern.

DESCRIPTION OF THE EMBODIMENTS

First Embodiment

Figure 1:
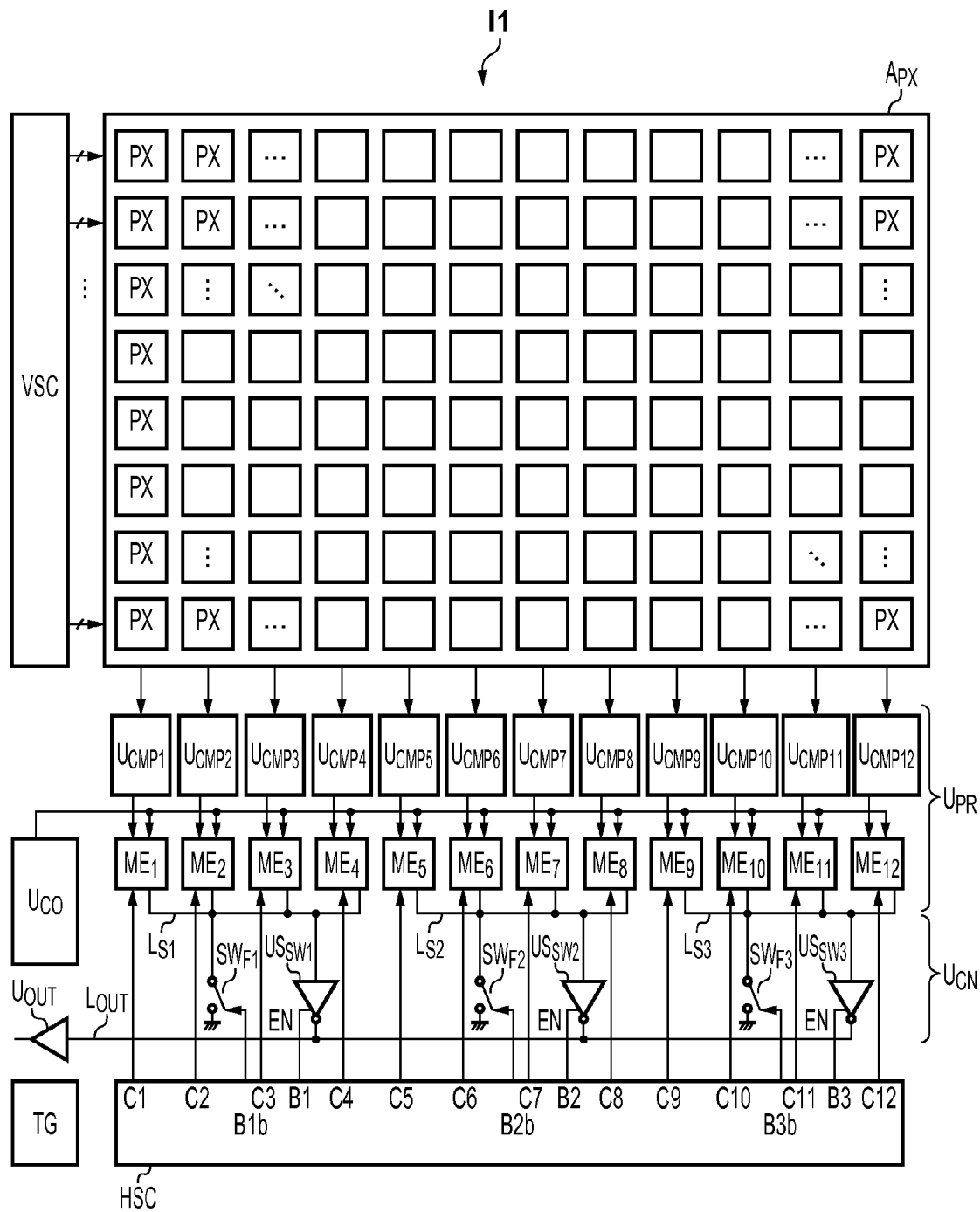
FIG. 1 is a view for explaining an example of the overall arrangement of a solid-state imaging apparatus.

FIG. 1 shows an example of the overall arrangement of a solid-state imaging apparatus I1 according to this embodiment. The solid-state imaging apparatus I1 includes a pixel array $A_{PX}$, a vertical scanning circuit VSC, processing units $U_{PR}$, a horizontal scanning circuit HSC, connecting units $U_{CN}$, an output unit $U_{OUT}$, and a timing generator TG.

The pixel array $A_{PX}$ in which a plurality of pixels PX are arrayed is formed. An arrangement in which the 8 (rows)×12 (columns) pixels PX are arrayed is illustrated here for the sake of simplicity. Each pixel PX can adopt a known pixel arrangement, and includes, for example, a photoelectric conversion element such as a photodiode and a plurality of transistors each configured to read out a signal corresponding to an amount of charges generated in the photoelectric conversion element.

The vertical scanning circuit VSC supplies control signals to the pixel array $A_{PX}$ and drives the plurality of pixels PX for the respective rows. The control signals include, for example, a signal for initializing (resetting) the above-described photoelectric conversion element, in addition to a signal for driving each transistor configured to read out the signal corresponding to the amount of the charges generated in the above-described photoelectric conversion element.

The processing units $U_{PR}$ are provided on the respective columns of the pixel array $A_{PX}$ and process the signals from the respective pixels PX. The processing units $U_{PR}$ serve as, for example, A/D conversion units which perform analog/digital conversion (A/D conversion) on the signals from the respective pixels PX on the respective columns, and include a comparator $U_{CMP1}$ (comparing unit) and the like and a memory $ME_1$ (signal holding unit) and the like. A counter $U_{CO}$ (counting unit) is also provided in common to each column of the pixel array $A_{PX}$.

Note that the comparator "$U_{CMP1}$" to a comparator "$U_{CMP12}$" provided in correspondence with the first column to the 12th column of the pixel array $A_{PX}$ are sometimes referred to as comparators "$U_{CMP}$" altogether in this specification. The same also applies to memories "ME".

Each comparator $U_{CMP}$ compares, for example, the signals from the respective pixels PX and a reference signal such as a ramp signal, and outputs a comparison result to the corresponding memory ME. The counter $U_{CO}$ counts a time elapsed after each comparator $U_{CMP}$ starts comparison. Each memory ME receives an output from the corresponding comparator $U_{CMP}$ and holds the count value of the counter $U_{CO}$ if the logic level of the output from the corresponding comparator $U_{CMP}$ is inverted in response to the inversion of the magnitude relationship of the signal levels between the signals from the respective pixels PX and the reference signal.

The processing units $U_{PR}$ provided on the respective columns of the above-described pixel array $A_{PX}$ are divided into three groups (referred to as "G1" to "G3") such that each group includes four processing units $U_{PR}$. In FIG. 1, the first group G1 corresponds to the processing units $U_{PR}$ on the first to the fourth columns, the second group G2 corresponds to the processing units $U_{PR}$ on the fifth to the eighth columns, and the third group G3 corresponds to the processing units $U_{PR}$ on the ninth to the twelfth columns. The output nodes of the four processing units $U_{PR}$ in the group G1 (the output nodes of the memories ME here) are connected to each other by a signal line $L_{S1}$. The same also applies to the groups G2 and G3. Note that the signal line "$L_{S1}$" to a signal line "$L_{S3}$" are sometimes referred to as signal lines "$L_S$" altogether in this specification.

Each connecting unit $U_{CN}$ is provided in a path between the processing units $U_{PR}$ and an output line $L_{OUT}$, and includes, for example, a tri-state inverter $U_{SW1}$ and the like and a switch $SW_{F1}$ and the like. Note that the tri-state inverter "$U_{SW1}$" to a tri-state inverter "$U_{SW3}$" are sometimes referred to as tri-state inverters "$U_{SW}$" altogether in this specification. The same also applies to switches "$SW_F$".

The tri-state inverters $U_{SW}$ are provided between the signal lines $L_S$ and the output line $L_{OUT}$, and output the signals from the four corresponding processing units $U_{PR}$ to the output line $L_{OUT}$ based on the control signals. The switches $SW_F$ are provided between the signal lines $L_S$ and a power supply line which transfers a predetermined power voltage such as a ground node, and fix the potentials of the signal lines $L_S$ based on the control signals. This arrangement allows each connecting unit $U_{CN}$ to change an electrical connection in the path between the processing units $U_{PR}$ and the output line $L_{OUT}$.

The horizontal scanning circuit HSC supplies the control signals for reading out the signals held by the memories ME to the processing units $U_{PR}$ and the connecting units $U_{CN}$, and functions as a control unit configured to read out the signals. For example, the horizontal scanning circuit HSC outputs control signals for reading out the signals of the memory $ME_1$ to a memory $ME_{12}$ from nodes C1 to C12, and also outputs control signals for controlling each connecting unit $U_{CN}$ from nodes B1 to B3 and B1b to B3b. Each of the control signals from the nodes B1b to B3b is at a logic level opposite to that of each of the control signals from the nodes B1 to B3.

The output unit $U_{OUT}$ is read out by each control signal from the horizontal scanning circuit HSC and outputs the signals of the memories ME output to the output line $L_{OUT}$. This output operation is also referred to as "horizontal transferring".

The timing generator TG receives reference clock signals from outside and supplies the corresponding clock signal to the vertical scanning circuit VSC, the horizontal scanning circuit HSC, or the like. Each of the vertical scanning circuit VSC and the horizontal scanning circuit HSC generates, based on the clock signal from the timing generator TG, a corresponding control signal and supplies it to a corresponding unit.

According to this arrangement, the processing units $U_{PR}$ provided on the respective columns of the pixel array $A_{PX}$ are divided into the three groups G1 to G3 and one output unit (the connecting unit $U_{CN}$ here) for outputting the signal of each processing unit $U_{PR}$ is provided for each group. Therefore, this arrangement reduces the load capacitance of the output line $L_{OUT}$, and is thus advantageous in increasing the speed of horizontal transferring.

Figure 2A:
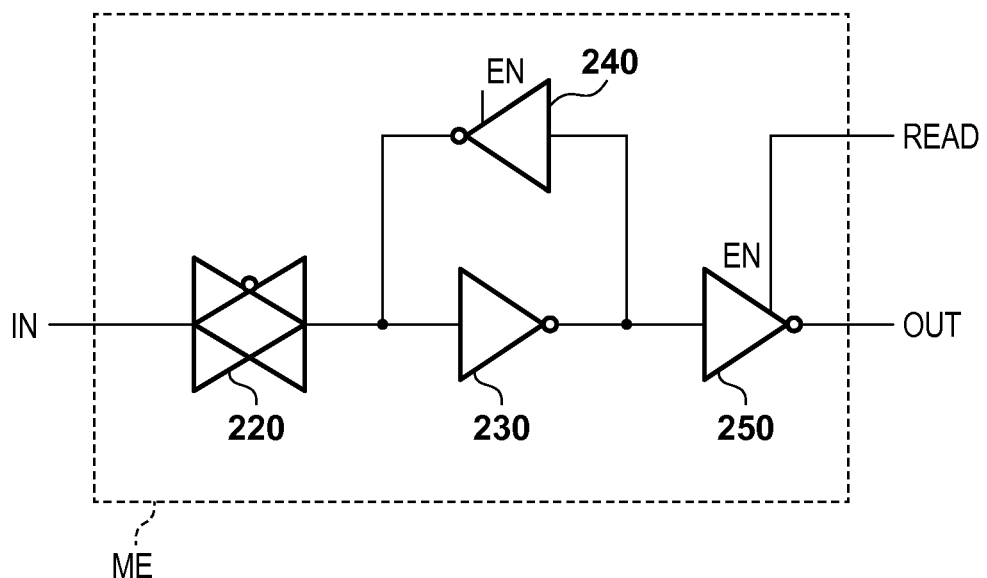
FIGS. 2A and 2B are views for explaining an example of the arrangement of a signal holding unit.

FIG. 2A shows an example of the arrangement of each memory ME. Each memory ME includes an analog switch 220, an inverter 230, a tri-state inverter 240, and a tri-state inverter 250. The tri-state inverter 240 or the like includes a control node EN and operates as an inverter in response to the activation of a control signal received by the node EN. In this arrangement, the inverter 230 and the tri-state inverter 240 hold the count values (digital signals) of the counter $U_{CO}$ input via the analog switch 220. Then, the digital signals are output from an output node OUT in response to the activation of a control signal received by a control node READ.

Figure 2B:
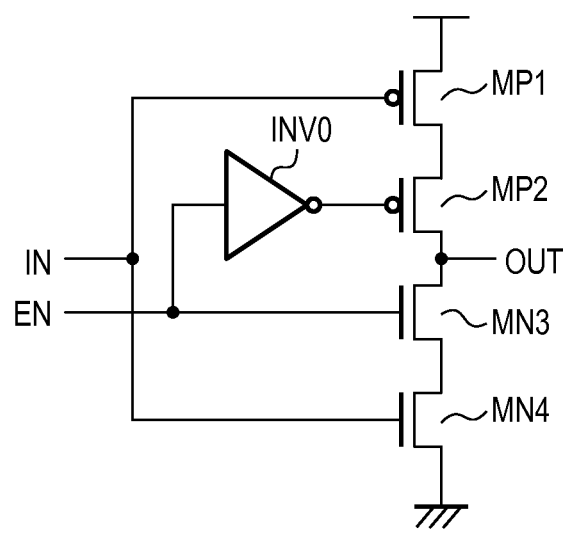

FIG. 2B shows an example of the arrangement of the tri-state inverter (240 or the like). The tri-state inverter includes, for example, PMOS transistors MP1 and MP2 and NMOS transistors MN3 and MN4 each provided in series between a power supply node and the ground node, and an inverter INV0. In this arrangement, for example, when the control signal received by the node EN is at high level (H), the transistors MP2 and MN3 are set in conductive states. The tri-state inverter is set in an active state, inverts a signal received by an input node IN, and outputs the inverted signal from the node OUT. On the other hand, when the control signal received by the node EN is at low level (L), the tri-state inverter is set in an inactive state and its output is set in a high impedance (HiZ) state.

The arrangement in which a digital signal of 1 bit is held in the memory ME has been illustrated here for the sake of simplicity. However, the memory ME may adopt an arrangement in which a digital signal of two or more bits is held.

Figure 3:
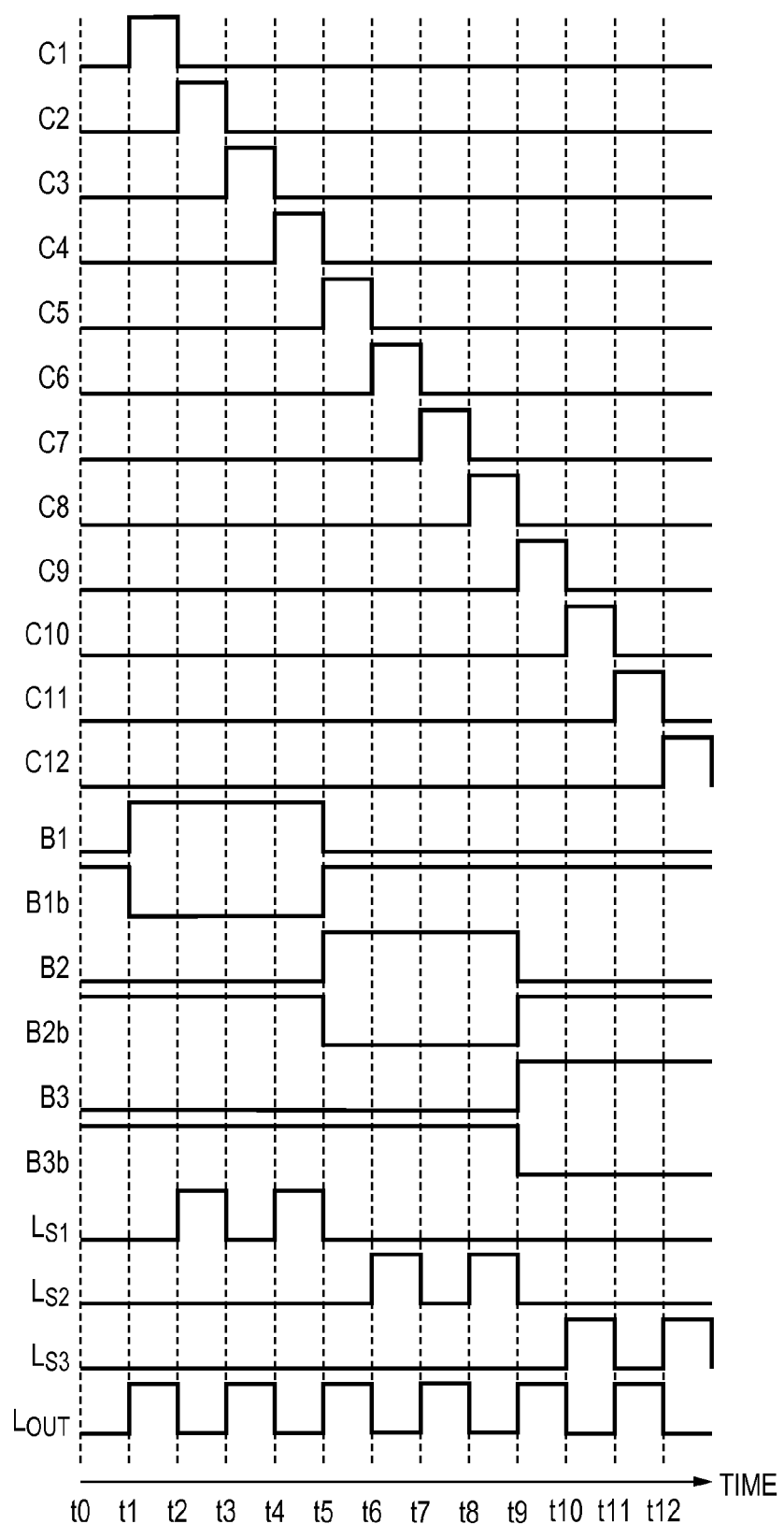
FIG. 3 is a view for explaining an example of the driving timing chart of the solid-state imaging apparatus.

FIG. 3 shows an example of the driving timing chart of the solid-state imaging apparatus I1. The time axis is plotted along the abscissa in FIG. 3. The ordinate in FIG. 3 represents the signal level of each control signal (the control signal from the node C1 or the like) from the horizontal scanning circuit HSC, and the signal levels of the signals of the signal lines $L_S$ and the output line $L_{OUT}$. Note that in the description below, for example, the signal level of the control signal from the node C1 will simply be referred to as the "signal level of C1". The same also applies to the other signal levels.

At times t0 and t1, the signal levels of C1 to C12 are at L and the outputs of the memories $ME_1$ to $ME_{12}$ are all in the HiZ states. During this period, the signal levels of B1 to B3 are at L and the tri-state inverters $U_{SW}$ are set in the inactive states, and also the signal levels of B1b to B3b are at H and the switches $SW_F$ are set in the conductive states, and the signal levels of $L_S$ are fixed at L.

At times t1 to t5, the signal level of B1 is set at H and the signal level of B1b is set at L. This sets the tri-state inverter $U_{SW1}$ in the active state and sets the switch $SW_{F1}$ in the non-conductive state. Then, the signal level of C1 is set at H at times t1 and t2, the signal level of C2 is set at H at times t2 and t3, the signal level of C3 is set at H at times t3 and t4, and the signal level of C4 is set at H at times t4 and t5. This sequentially sets the memories $ME_1$ to $ME_4$ in output enable states (or more specifically, sequentially sets the tri-state inverters 250 in the active states) and outputs the digital signals of the memories $ME_1$ to $ME_4$ to the output line $L_{OUT}$.

That is, at times t1 to t5, the digital signals of the respective memories $ME_1$ to $ME_4$ in the group G1 are sequentially read out.

On the other hand, in the groups G2 and G3, the outputs of the memories $ME_5$ to $ME_{12}$ are in the HiZ states, and the tri-state inverters $U_{SW2}$ and $U_{SW3}$ are in the inactive states. At this time, the switches $SW_{F2}$ and $SW_{F3}$ are set in the conductive states, and the signal levels of $L_{S2}$ and $L_{S3}$ are set at L.

Note that FIG. 3 illustrates a mode in which the signal level of $L_{S1}$ is set in the order of L, H, L, and H and the signal level of $L_{OUT}$ is set in the order of H, L, H, and L at times t1 to t5. These signal levels correspond to the values of the respective digital signals of the memories $ME_1$ to $ME_4$.

Next, at times t5 to t9, the digital signals of the respective memories $ME_5$ to $ME_8$ in the group G2 are sequentially read out in the same manner as at the times t1 to t5. On the other hand, in the groups G1 and G3, the outputs of the respective memories ME are set in the HiZ states, and the tri-state inverters $U_{SW1}$ and $U_{SW3}$ are set in the inactive states. Furthermore, the switches $SW_{F1}$ and $SW_{F3}$ are set in the conductive states, and the signal levels of $L_{S1}$ and $L_{S8}$ are fixed at L. Likewise, after time t9, the outputs of the respective memories ME in the groups G1 and G2 are set in the HiZ states, and the tri-state inverters $U_{SW2}$ and $U_{SW2}$ are set in the inactive states. Furthermore, the switches $SW_{F1}$ and $SW_{F2}$ are set in the conductive states, and the signal levels of $L_{S1}$ and $L_{S2}$ are fixed at L.

As described above, according to this embodiment, one group is selected from the groups G1 to G3 and the signals from the four processing units $U_{PR}$ in the selected group are output via the output line $L_{OUT}$. At this time, in each unselected group, the potential of the signal line $L_S$ which connects the output nodes of the four processing units $U_{PR}$ to each other is fixed to a predetermined potential by the switch $SW_F$. This makes it possible to prevent the potential of the signal line $L_S$ in each unselected group from becoming too high or too low. In this embodiment, the potentials of the signal lines $L_{S2}$ and $L_{S3}$ are fixed at times t1 to t5 when the signals are read out from the processing units in the group G1.

If the potential of the signal line according to each unselected group is not fixed, the signal lines $L_{S2}$ and $L_{S3}$ before time t5 are set in floating states. At this time, if the level of each signal read out from the group G1 changes to high level, the potential of the output line $L_{OUT}$ becomes high, and thus the potentials of the signal lines $L_{S2}$ and $L_{S3}$ can also become high due to a capacitive coupling. For example, if the potentials of the signal lines $L_{S2}$ and $L_{S3}$ become too high, the insulation breakdown of the gate insulation film of the NMOS transistor MN4 shown in FIG. 2B may occur. Further, for example, since each signal lines $L_S$ is the output nodes of the processing units, a portion between the drain and well of the PMOS transistor MP2 shown in FIG. 2B is set in a forward bias state as the potentials of the output nodes increase, which may bring about latch-up or the like.

To cope with this, this embodiment prevents, for example, a potential variation in the signal line $L_S$ of each unselected group that may be caused by noise or the like when driving the respective processing units $U_{PR}$ in the selected group. Therefore, this embodiment can prevent a malfunction of the solid-state imaging apparatus I1, latch-up, the insulation breakdown of the MOS transistors, or the like, and is thus advantageous in increasing the reliability of the solid-state imaging apparatus I1.

Second Embodiment

Figure 4:
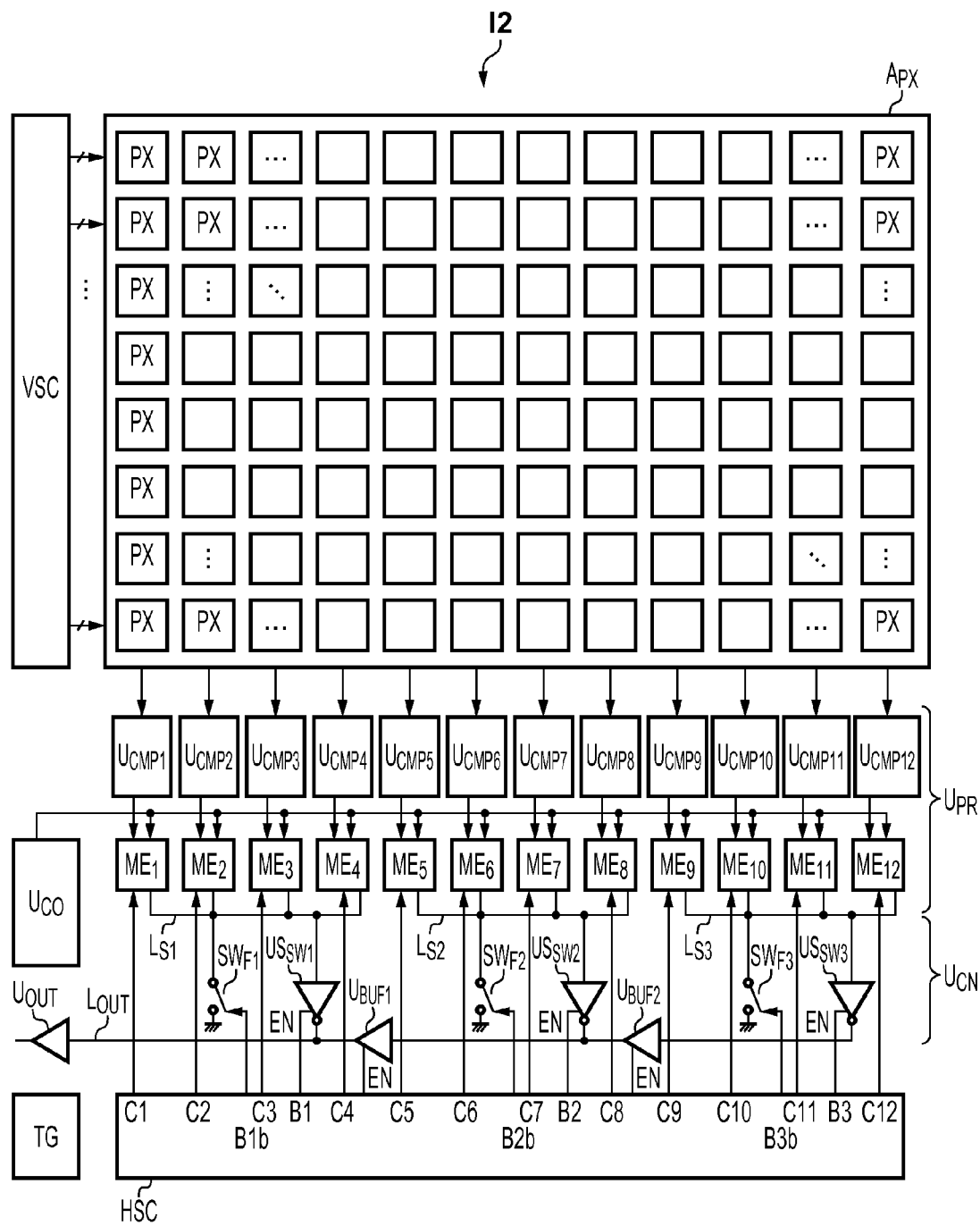
FIG. 4 is a view for explaining an example of the overall arrangement of the solid-state imaging apparatus.

A solid-state imaging apparatus 12 according to the second embodiment will be described below with reference to FIG. 4. The main difference between this embodiment and the first embodiment is that buffer circuits $U_{BUF}$ ($U_{BUF1}$ and $U_{BUF2}$) are inserted in an output line $L_{OUT}$.

Since the output line $L_{OUT}$ in the first embodiment has a length equal to or larger than the width of a pixel array $A_{PX}$, its wiring capacitance is comparatively large and the speed of horizontal transferring may decrease. To prevent this, this embodiment provides the buffer circuits $U_{BUF}$ configured to buffer signals which propagate through the output line $L_{OUT}$.

The buffer circuit $U_{BUF1}$ is provided between a portion corresponding to a group G1 and a portion corresponding to a group G2 in the output line $L_{OUT}$. The buffer circuit $U_{BUF2}$ is provided between a portion corresponding to the group G2 and a portion corresponding to a group G3 in the output line $L_{OUT}$.

Each buffer circuit $U_{BUF}$ includes a control node EN configured to receive a control signal. Each buffer circuit $U_{BUF}$ can be set in an active state or an inactive state based on the control signal. Each buffer circuit $U_{BUF}$ may be formed by using, for example, two tri-state inverters. However, another arrangement may be adopted.

In this arrangement, the groups are provided in the order of G1, G2, and G3 from the side of an output unit $U_{OUT}$. Therefore, for example, when each processing unit $U_{PR}$ in the group G1 outputs the signal, the buffer circuits $U_{BUF1}$ and $U_{BUF2}$ are not used. Therefore, in this case, both of the buffer circuits $U_{BUF1}$ and $U_{BUF2}$ can be maintained in the inactive states. Furthermore, for example, when each processing unit $U_{PR}$ in the group G2 outputs the signal, the buffer circuit $U_{BUF1}$ is used while the buffer circuit $U_{BUF2}$ is not used. Therefore, in this case, the buffer circuit $U_{BUF1}$ is set in the active state and the buffer circuit $U_{BUF2}$ can be maintained in the inactive state. When each processing unit $U_{PR}$ in the group G3 outputs the signal, both of the buffer circuits $U_{BUF1}$ and $U_{BUF2}$ can be set in the active states.

This embodiment can reduce power consumption when outputting the signal from each processing unit $U_{PR}$ because the unused buffer circuits $U_{BUF}$ are maintained in the inactive states. Furthermore, since the buffer circuits $U_{BUF}$ are inserted in the output line $L_{OUT}$ at predetermined intervals, this embodiment reduces a load capacitance that should be driven by one tri-state inverter $U_{SW}$ provided for each group, and is thus advantageous in increasing the speed of horizontal transferring.

Third Embodiment

Figure 5:
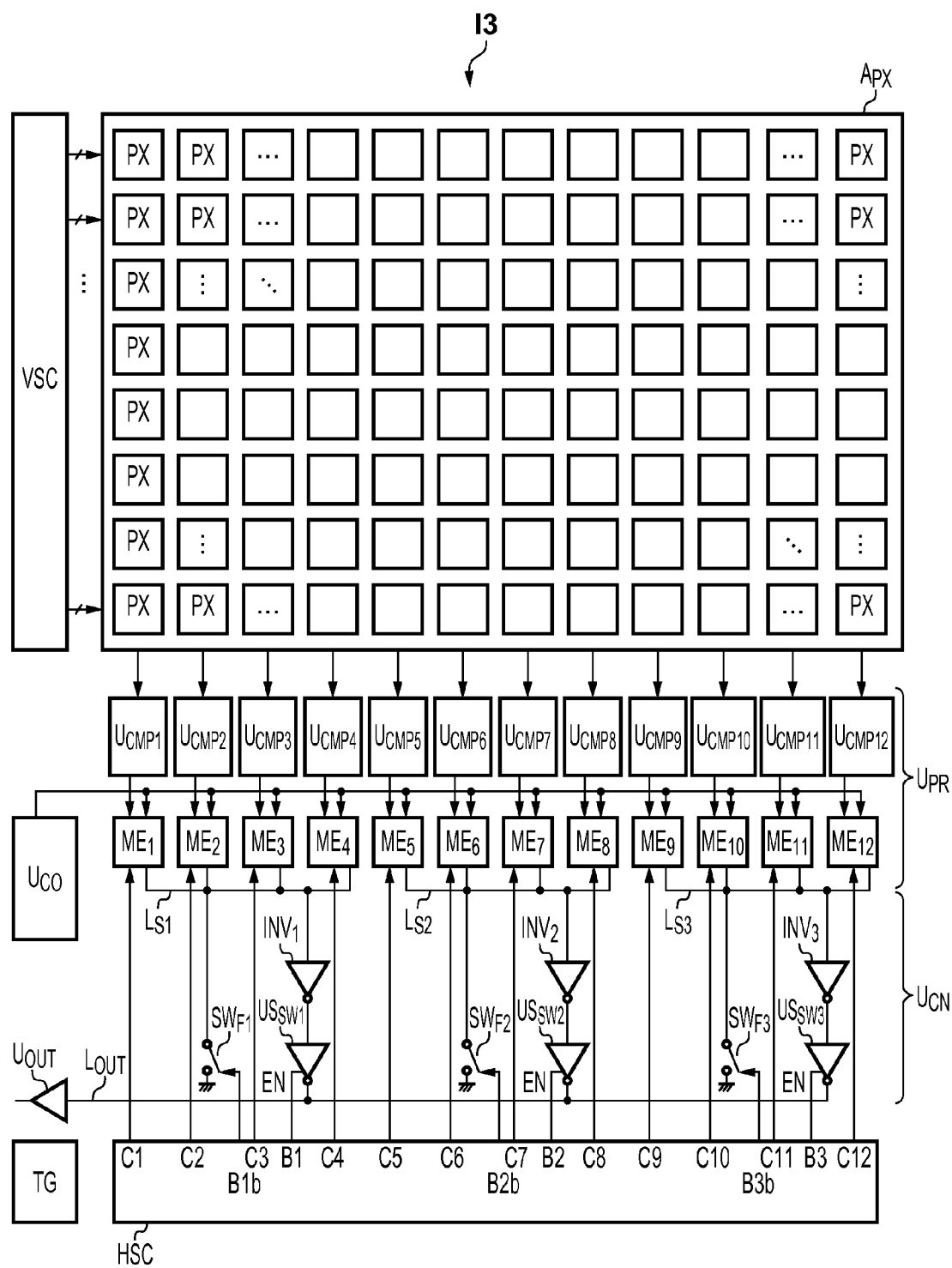
FIG. 5 is a view for explaining an example of the overall arrangement of a solid-state imaging apparatus.

A solid-state imaging apparatus 13 according to the third embodiment will be described below with reference to FIG. 5. The main difference between this embodiment and the first embodiment is that inverters INV ($INV_1$ to $INV_3$) are inserted between signal lines $L_S$ and tri-state inverters $U_{SW}$ in connecting units $U_{CN}$.

As described above, the load capacitance that should be driven by the one tri-state inverter $U_{SW}$ provided for each group is large. Therefore, a transistor MP1 or the like which forms the tri-state inverter $U_{SW}$ needs to be designed to have a size which allows horizontal transferring to be performed at a predetermined speed. However, as the size of the transistor MP1 or the like increases, the input capacitance of the tri-state inverter $U_{SW}$ also increases. On the other hand, four memories ME in each group are connected to the corresponding signal line $L_S$ in common. For this reason, when outputting digital signals of the respective memories ME, a time required for both of the input capacitance of the tri-state inverter $U_{SW}$ and the load capacitance of the signal line $L_S$ to reach the signal levels of the digital signals increases. This can be a serious problem by a multiple pixel structure or the increasing number of processing units included in each group along with the multiple pixel structure.

To cope with this, this embodiment provides the inverters INV between the signal lines $L_S$ and the tri-state inverters $U_{SW}$. This arrangement is advantageous in increasing the output speed of the digital signal of each memory ME.

The arrangement in which the inverters INV are provided between the signal lines $L_S$ and the tri-state inverters $U_{SW}$ has been illustrated here. However, the present invention is not limited to this arrangement as long as the load capacitance of each memory ME when outputting the digital signal of each memory ME is reduced. For example, buffer circuits may be used instead of the inverters INV.

Fourth Embodiment

Figure 6:
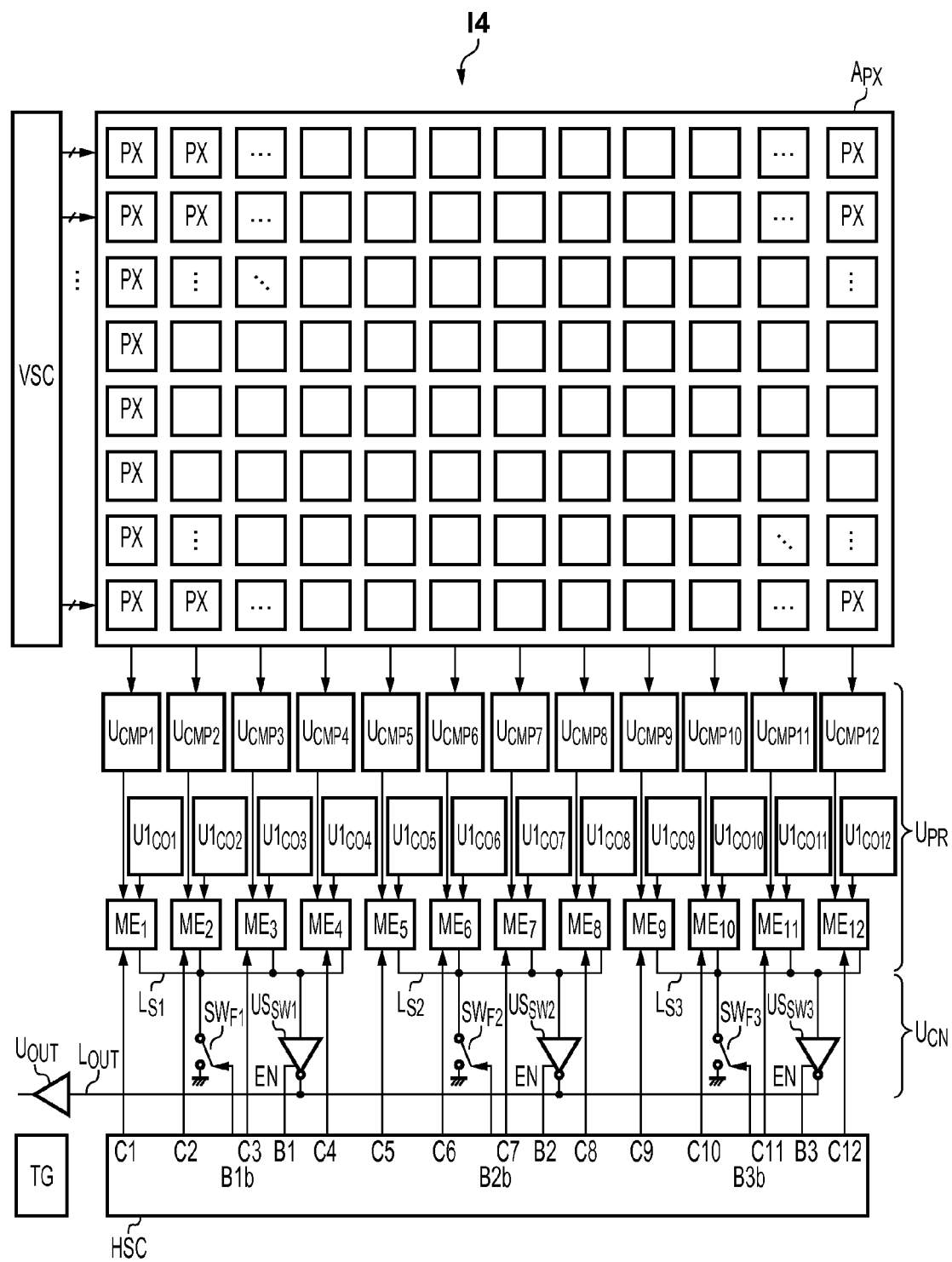
FIG. 6 is a view for explaining an example of the overall arrangement of a solid-state imaging apparatus.

A solid-state imaging apparatus 14 according to the fourth embodiment will be described below with reference to FIG. 6. The main difference between this embodiment and the first embodiment is that instead of a counter $U_{CO}$, counters $U1_{CO}$ ($U1_{CO1}$ to $U1_{CO12}$) are individually provided for the respective columns of a pixel array $A_{PX}$. Each counter $U1_{CO}$ counts a time elapsed after a comparator $U_{CMP}$ starts comparison and each counter value is held in a corresponding memory ME as a digital signal.

This embodiment can obtain the same effects as in the first embodiment and also provides the counters $U1_{CO}$ on the respective columns of the pixel array $A_{PX}$, which allows for, for example, A/D conversion at a higher resolution.

Fifth Embodiment

Figure 7:
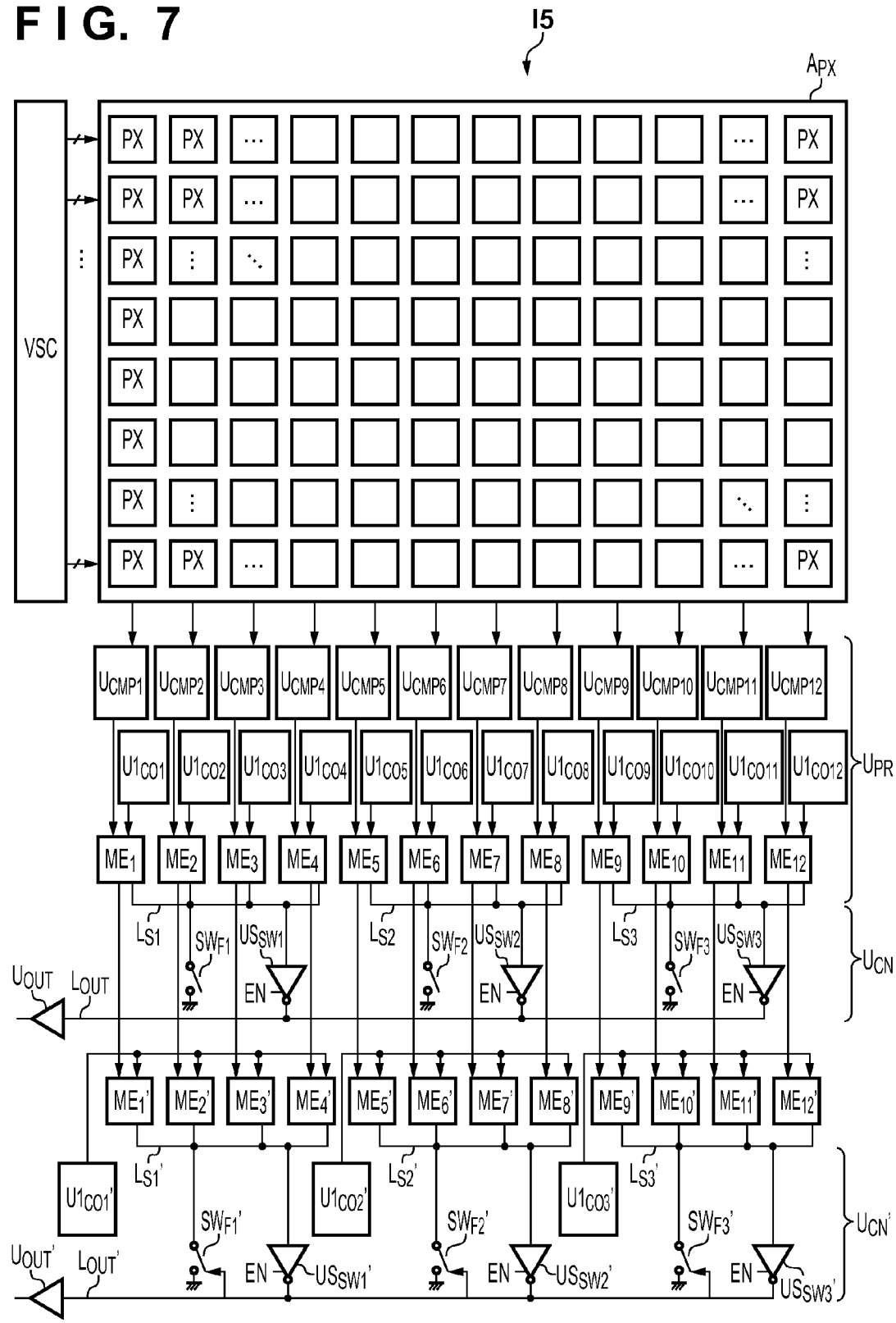
FIG. 7 is a view for explaining an example of the overall arrangement of a solid-state imaging apparatus.

A solid-state imaging apparatus 15 according to the fifth embodiment will be described below with reference to FIG. 7. The main difference between this embodiment and the fourth embodiment is that out of the A/D converted digital signals, the signals of upper bits and the signals of lower bits are held individually.

More specifically, the solid-state imaging apparatus 15 further includes counters $U1_{CO}'$ ($U1_{CO1}'$ to $U1_{CO3}'$) in addition to the counters $U1_{CO}$ according to the fourth embodiment, memories ME' ($ME_1'$ to $ME_{12}'$), connecting units $U_{CN}'$, an output line $L_{OUT}'$, and an output unit $U_{OUT}'$. The counters $U1_{CO1}'$ to $U1_{CO3}'$ are provided to correspond to groups G1 to G3, respectively. The memories $ME_1'$ to $ME_{12}'$ are provided to correspond to the respective columns of the pixel array $A_{PX}$. As in the connecting units $U_{CN}$, the connecting units $U_{CN}'$ are provided in paths between the output line $L_{OUT}'$ and signal lines $L_S'$ ($L_{S1}'$ to $L_{S3}'$) which connect the output nodes of the four memories ME to each other. The connecting units $U_{CN}'$ adopt the same arrangement as the connecting units $U_{CN}$, and include tri-state inverters $U_{SW}'$ ($U_{SW1}'$ to $U_{SW3}'$) and switches $SW_F'$ ($SW_{F1}'$ to $SW_{F3}'$). The connecting units $U_{CN}'$ can be controlled in a similar manner to the connecting units $U_{CN}$. The output unit $U_{OUT}'$ outputs the digital signal of each memory ME' output to the output line $L_{OUT}'$.

In this embodiment, out of the digital signals corresponding to the outputs of respective pixels, the signals of the upper bits are output from an output unit $U_{OUT}$ and the signals of the lower bits are output from the output unit $U_{OUT}'$. The counter $U1_{CO}$ on each column performs a count operation at an operating frequency f1 and the counter $U1_{CO}'$ provided for each group performs the count operation at an operating frequency f2 which is higher than the operating frequency f1. This allows each counter $U1_{CO}'$ to obtain, as digital values, the least significant bits of the counters $U1_{CO}$ at a high resolution. Note that the operating frequencies f1 and f2 are preferably set such that f2 becomes an integral multiple of f1.

In this embodiment, the counter provided for each group performs the count operation at the relatively higher operating frequency, while the counter provided for each column performs the count operation at the relatively lower operating frequency. This arrangement can reduce power consumption as compared with a case in which the counter which performs the count operation at the high operating frequency is provided for each column. This embodiment provides the counter for each group. However, a further reduction in power consumption can be achieved by providing a common counter of all the groups.

This embodiment can obtain the same effects as in the first embodiment and also perform A/D conversion at a higher resolution.

Sixth Embodiment

Figure 8:
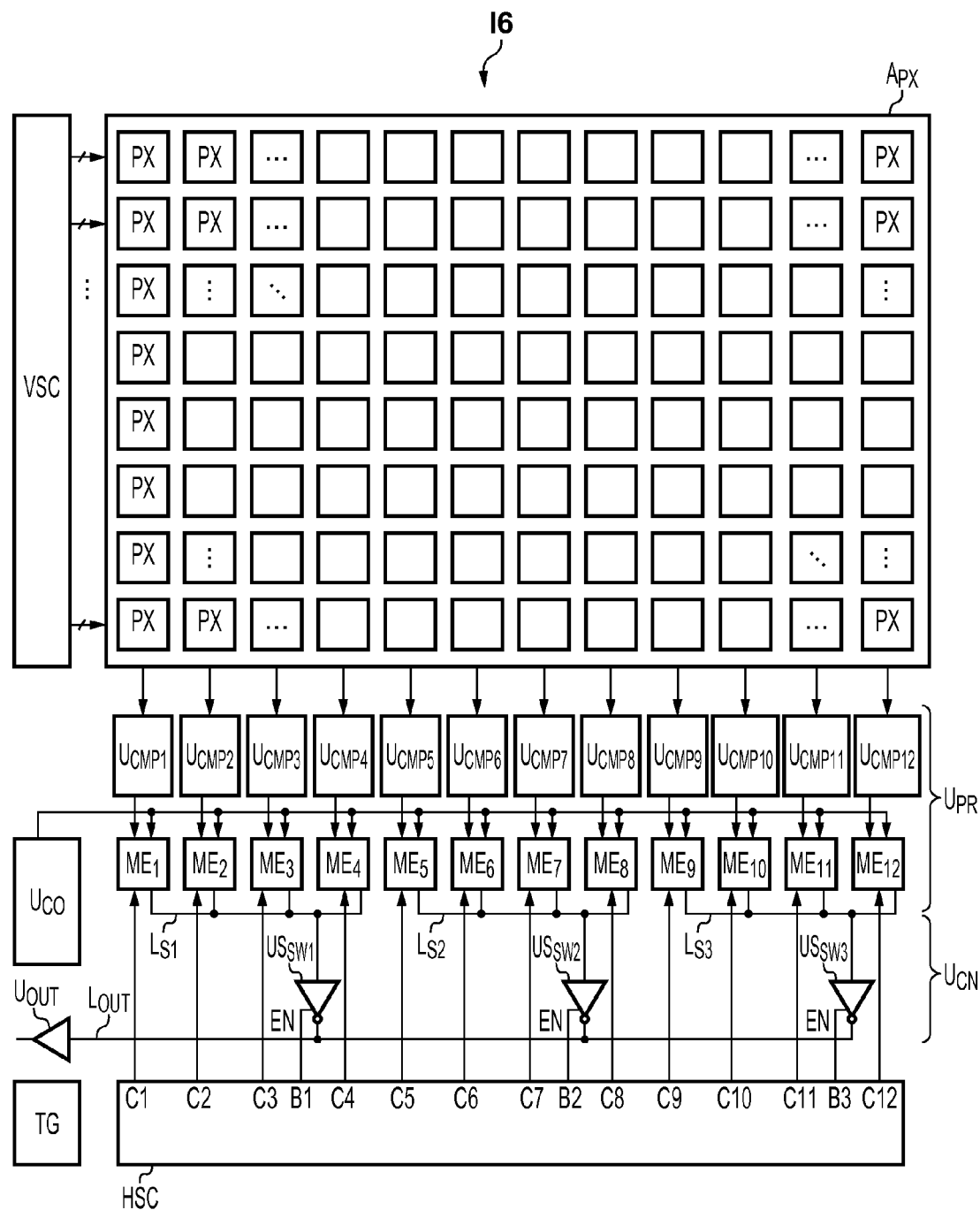
FIG. 8 is a view for explaining an example of the overall arrangement of a solid-state imaging apparatus.

A solid-state imaging apparatus 16 according to the sixth embodiment will be described below with reference to FIGS. 8 and 9. The main difference between this embodiment and the first embodiment is that each connecting unit $U_{CN}$ does not include switches $SW_F$, as illustrated in FIG. 8. In this arrangement, one memory out of four memories ME in each group G is used to fix the potential of a signal line $L_S$.

Figure 9:
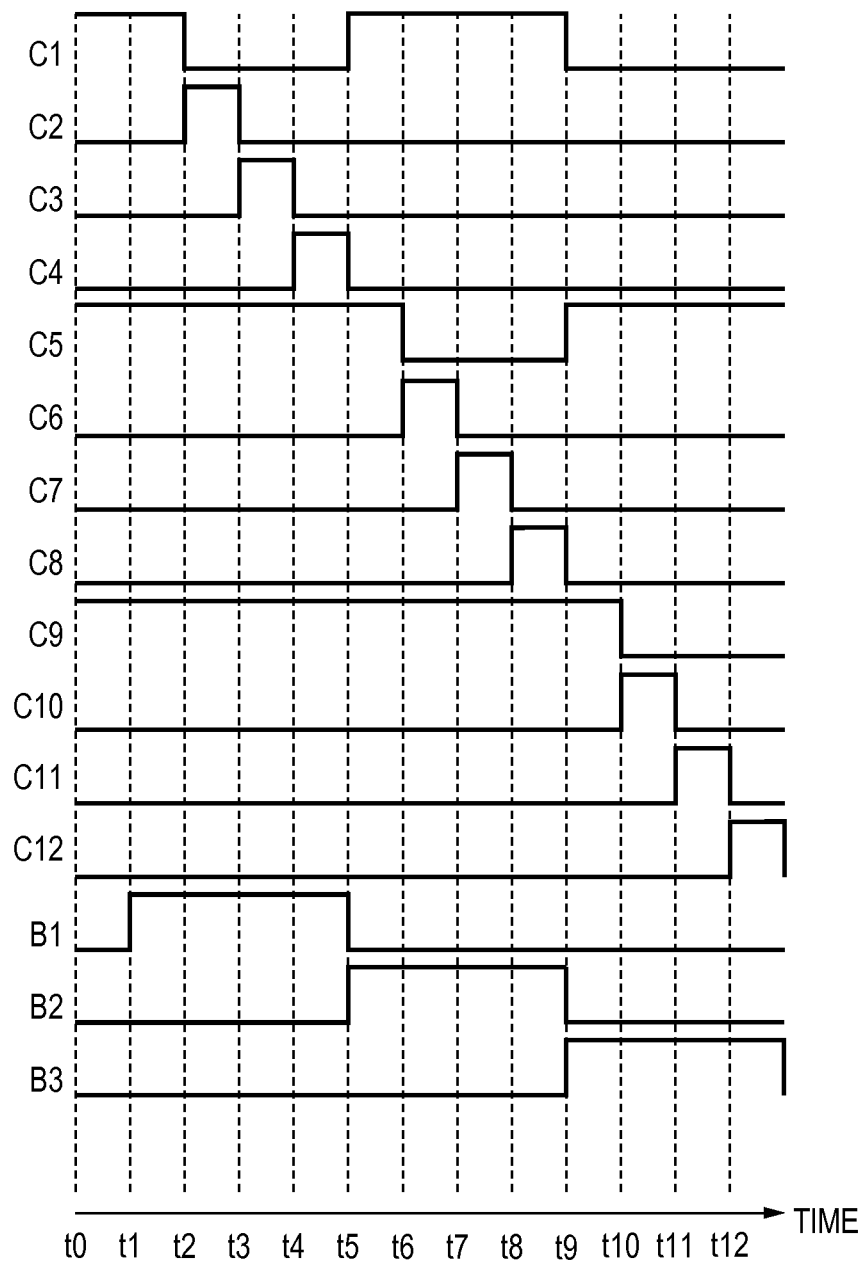
FIG. 9 is a view for explaining an example of the driving timing chart of the solid-state imaging apparatus.

FIG. 9 shows an example of the driving timing chart of the solid-state imaging apparatus 16 as in FIG. 3 of the first embodiment. In FIG. 9, the waveform of the control signal from each of control nodes C1, C5, and C9 is different from that in FIG. 3. More specifically, the signal level of C1 is set at H at times t1 and t2 in the first embodiment, whereas in this embodiment, it is set at H not only at times t1 and t2 but also at times t0 and t1, and after time t5.

That is, while digital signals of the respective memories ME in the other groups G2 and G3 are output, in the group G1, the memory $ME_1$ is maintained in an output enable state and the memories $ME_2$ to $ME_4$ are maintained in output disable states. A potential variation in a signal line $L_{S1}$ in the group G1 that may be caused by noise or the like when driving respective processing units $U_{PR}$ in the groups G2 and G3 is prevented because the memory $ME_1$ is maintained in the output enable state.

Likewise, while the digital signals of the respective memories ME in the groups G1 and G3 are output, in the group G2, the memory $ME_5$ out of the memories $ME_5$ to ME$_8$ is maintained in the output enable state. While the digital signals of the respective memories ME in the groups G1 and G2 are output, in the group G3, the memory ME$_9$ out of the memories ME$_9$ to ME$_{12}$ is maintained in the output enable state.

This embodiment can obtain the same effects as in the first embodiment with a simpler arrangement. The arrangement in which the memory ME$_1$ in the group G1, the memory ME$_5$ in the group G2, and the memory ME$_9$ in the group G3 are used to fix the potentials of the respective signal lines L$_S$ has been illustrated here. However, the present invention is not limited to this example and any memories ME in the respective groups G may be used.

Seventh Embodiment

Figure 10:
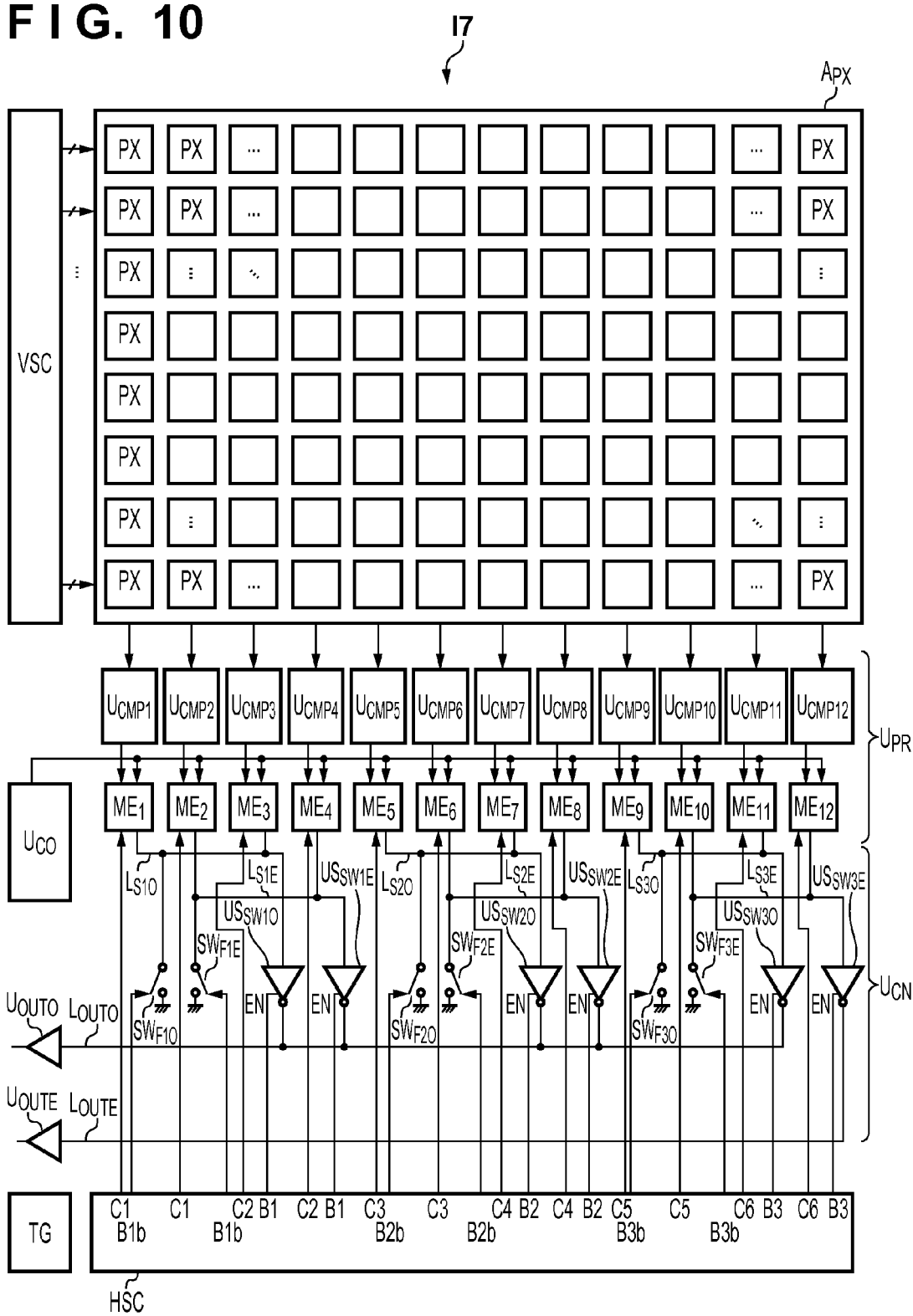
FIG. 10 is a view for explaining an example of the overall arrangement of a solid-state imaging apparatus.

A solid-state imaging apparatus 17 according to the seventh embodiment will be described below with reference to FIGS. 10 and 11. The main difference between this embodiment and the first embodiment is that two tri-state inverters U$_{SW}$ and two switches SW$_F$ of a connecting unit U$_{CN}$ are provided for each group G, as illustrated in FIG. 10.

One of the above-described two tri-state inverters U$_{SW}$ and one of the two switches SW$_F$ are provided such that, for example, each of them corresponds to an odd numbered row in each group G. In FIG. 10, they are referred to as "tri-state inverters U$_{SW1O}$ to U$_{SW3O}$" and "switches SW$_{F1O}$ to SW$_{F3O}$", respectively.

Also, the other of the above-described two tri-state inverters U$_{SW}$ and the other of the two switches SW$_F$ are provided such that, for example, each of them corresponds to an even numbered row in each group G. In FIG. 10, they are referred to as "tri-state inverters U$_{SW1E}$ to U$_{SW3E}$" and "switches SW$_{F1E}$ to SW$_{F3E}$", respectively.

Furthermore, signal lines L$_{S1}$ to L$_{S3}$ which correspond to the odd numbered rows are referred to as "L$_{S1O}$ to L$_{S3O}$" and the even numbered rows, "L$_{S1E}$ to L$_{S3E}$". Also, the output lines L$_{OUT}$ and output units U$_{OUT}$ which correspond to the odd numbered row are respectively referred to as "L$_{OUTO}$" and "U$_{OUTO}$", and the even numbered row, "L$_{OUTE}$" and "U$_{OUTE}$".

This arrangement can output a digital signal of each memory ME on each odd numbered row and a digital signal of each memory ME on each even numbered row simultaneously, and is thus advantageous in increasing a data reading speed.

Since the digital signals having different values can propagate through the output lines L$_{OUTO}$ and L$_{OUTE}$, a crosstalk may occur between the output lines L$_{OUTO}$ and L$_{OUTE}$. To prevent this crosstalk, it is preferable, for example, to arrange the signal line L$_{S1O}$ and the like and a power supply line between the output lines L$_{OUTO}$ and L$_{OUTE}$.

FIG. 11 is a schematic view showing an upper surface of a layout when the signal line is arranged between the output lines L$_{OUTO}$ and L$_{OUTE}$. An arrangement in which the signal line L$_{S1E}$ is arranged between the output lines L$_{OUTO}$ and L$_{OUTE}$ is illustrated here.

In FIG. 11, a plurality of wiring patterns ML1 are arranged in a wiring layer which is different from the signal line L$_{S1O}$ and the like and the output line L$_{OUTO}$ and the like in a direction crossing the signal line L$_{S1O}$ and the like and the output line L$_{OUTO}$ and the like. Each wiring pattern ML1 is electrically connected to the corresponding signal line L$_{S1O}$ or the like or output line L$_{OUTO}$ or the like via a via V1. With this arrangement, the respective units are electrically connected to each other.

As described above, the signal line L$_{S1O}$ or the like is fixed at L in the group G which is not the output target of the digital signals. Therefore, the signal line L$_{S1O}$ or the like functions as a shield against the crosstalk between the output lines L$_{OUTO}$ and L$_{OUTE}$. The arrangement in which the signal line L$_{S1E}$ or the like is arranged between the output lines L$_{OUTO}$ and L$_{OUTE}$ has been illustrated in this embodiment. However, the signal line L$_{S1E}$ may be used as a shield between other wirings.

As described above, this embodiment can obtain the same effects as in the first embodiment, and is also advantageous in increasing the data reading speed and preventing the crosstalk between the wirings.

The seven embodiments have been described above. However, the present invention is not limited to these. The present invention may appropriately change some of them or combine the respective embodiments in accordance with the object or the like. For example, the connecting unit U$_{CN}$ may be arranged to be able to change an electrical connection in a path between processing units U$_{PR}$ and the output lines L$_{OUT}$, and may use, as its switches SW$_F$ and tri-state inverters U$_{SW}$, other switch elements which are set in conductive states or non-conductive states based on control signals. For example, analog switches or one of NMOS transistors and PMOS transistors may be used as the switches SW$_F$.

(Imaging System)

In the above embodiments, the present invention has been described by exemplifying a solid-state imaging apparatus included in an imaging system represented by a camera or the like. The concept of the imaging system includes not only apparatuses primarily aiming at shooting but also apparatuses (for example, a personal computer and a portable terminal) secondarily having a shooting function. The imaging system can include the solid-state imaging apparatus exemplified in the above embodiments, and a calculation unit (a processor or the like) that processes a signal output from the solid-state imaging apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075727, filed Apr. 1, 2014, which is hereby incorporated by reference herein in its entirety.

What is claimed is:

1. A solid-state imaging apparatus comprising:
    a pixel array in which a plurality of pixels are arrayed;
    a plurality of processing units configured to process signals each being based on a signal which is output from each pixel on each column of the pixel array, wherein the plurality of processing units form a plurality of groups each including two or more processing units;
    an output line;
    a power supply line configured to transfer a power voltage;
    a plurality of signal lines each corresponding to a different one of the plurality of groups, and each configured to connect to output nodes of the two or more processing units in the corresponding one of the plurality of groups;
    a plurality of connecting units each corresponding to a different one of the plurality of groups; and
    a control unit, wherein, in a case of outputting signals from the processing units in one group of the plurality of groups during a first period, the control unit, during the first period, controls the connecting unit of the one group, to connect the output line and the signal line of the one group electrically and to output the signals from the processing units in the one group, the control unit, during the first period, controls the connecting unit of another group, to connect the power supply line and the signal line of the another group electrically and to set an electrical path between the output line and the signal line of the another group, in a high impedance state, and each of the plurality of processing units includes a conversion unit configured to perform analog/digital conversion on the signals from the respective pixels and a signal holding unit configured to hold the signals from the conversion unit.

2. The apparatus according to claim 1, wherein the plurality of groups include a first group and a second group, and the output line includes a first portion in which the signals from the respective processing units in the first group are received and a second portion in which the signals from the respective processing units in the second group are received, the solid-state imaging apparatus further comprises a buffer circuit including an input node connected to the first portion and an output node connected to the second portion.

3. The apparatus according to claim 2, wherein the control unit controls the buffer circuit to be in an active state in a case of outputting the signals from the processing units in the first group and in an inactive state in a case of outputting the signals from the processing units in the second group.

4. The apparatus according to claim 1, wherein each of the plurality of connecting units further includes a buffer circuit configured to buffer a signal from a corresponding signal line.

5. The apparatus according to claim 1, wherein the conversion unit includes a comparing unit configured to compare the signals from the respective pixels and a reference signal, and a counting unit configured to count a time elapsed before a magnitude relationship between a signal level of the reference signal and signal levels of the signals from the respective pixels is inverted.

6. The apparatus according to claim 1, wherein the plurality of signal lines are provided to individually transfer the signals of upper bits and the signals of lower bits out of the signals from the conversion units held by the signal holding units.

7. The apparatus according to claim 1, wherein each of the plurality of connecting units includes a first switch configured to electrically connect the signal lines and the output line, and a second switch configured to electrically connect the signal lines and the power supply line, and in a case of outputting the signals from the processing units in the one group, the control unit sets the first switch in a conductive state and the second switch in a non-conductive state in the one group, and sets the first switch in the non-conductive state and the second switch in the conductive state in the another group.

8. A solid-state imaging apparatus comprising:

a pixel array in which a plurality of pixels are arrayed;

a plurality of processing units configured to process signals each being based on a signal which is output from each pixel on each column of the pixel array, wherein the plurality of processing units form a plurality of groups each including two or more processing units; an output line;

a plurality of signal lines each corresponding to a different one of the plurality of groups, and each configured to connect to output nodes of the two or more processing units in the corresponding one of the plurality of groups;

a plurality of switches each corresponding to a different one of the plurality of groups, each provided in a path between the output line and the signal line of the corresponding one of the plurality of groups; and a control unit, wherein, in a case of outputting signals from the processing units in one group out of the plurality of groups during a first period, the control unit, during the first period, controls the switch of the one group to be set in a conductive state so as to connect the output line and the signal line of the one group electrically, and to output the signals from the processing units in the one group, the control unit, during the first period, controls the switch of another group to be set in a non-conductive state, and controls one of the two or more processing units of the another group to output a signal for fixing a potential of the signal line of the another group, and each of the plurality of processing units includes a conversion unit configured to perform analog/digital conversion on the signals from the respective pixels and a signal holding unit configured to hold the signals from the conversion unit.

9. The apparatus according to claim 1, further comprising an output unit configured to output the signals from the respective processing units supplied via the output line.

10. The apparatus according to claim 9, wherein the output line includes a first output line and a second output line, and the output unit includes a first output unit configured to output the signals from some of two or more processing units in each group output via the first output line, and a second output unit configured to output the signals from other some of the two or more processing units in each group output via the second output line.

11. The apparatus according to claim 10, wherein the plurality of signal lines are arranged between the first output line and the second output line.

12. A camera comprising:

a solid-state imaging apparatus comprising a pixel array in which a plurality of pixels are arrayed; and a plurality of processing units configured to process signals each being based on a signal which is output from each pixel on each column of the pixel array, wherein the plurality of processing units forming a plurality of groups each including two or more processing units;

an output line;

a power supply line configured to transfer a power voltage;

a plurality of signal lines each corresponding to a different one of the plurality of groups, and each configured to connect to output nodes of the two or more processing units in the corresponding one of the plurality of groups;

a plurality of connecting units each corresponding to a different one of the plurality of groups; and
a control unit; and
a calculation unit configured to process a signal from the solid-state imaging apparatus,
wherein, in a case of outputting signals from the processing units in one group of the plurality of groups during a first period,
the control unit, during the first period, controls the connecting unit of the one group, so as to connect the output line and the signal line of the one group electrically and to output the signals from the processing units in the one group,
the control unit, during the first period, controls the connecting unit of another group, so as to connect the power supply line and the signal line of the another group electrically and to set an electrical path between the output line and the signal line of the another group, in a high impedance state, and
each of the plurality of processing units includes a conversion unit configured to perform analog/digital conversion on the signals from the respective pixels and a signal holding unit configured to hold the signals from the conversion unit.

* * * * *